United States Patent Office 2,863,654
Patented Dec. 9, 1958

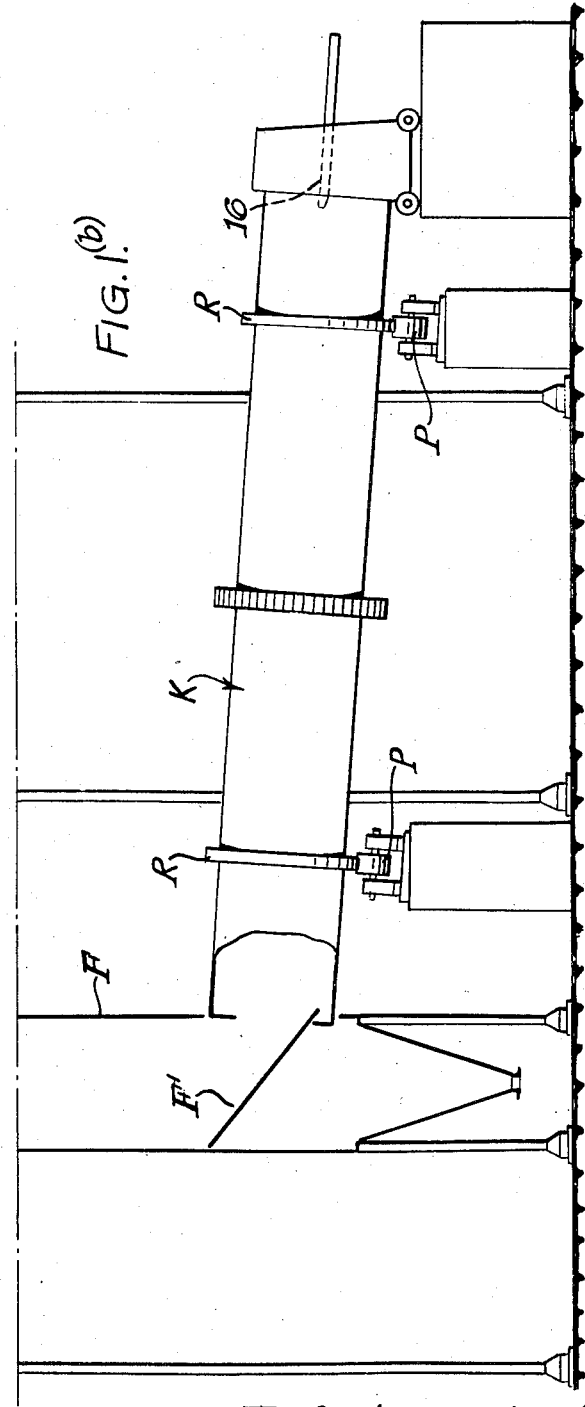

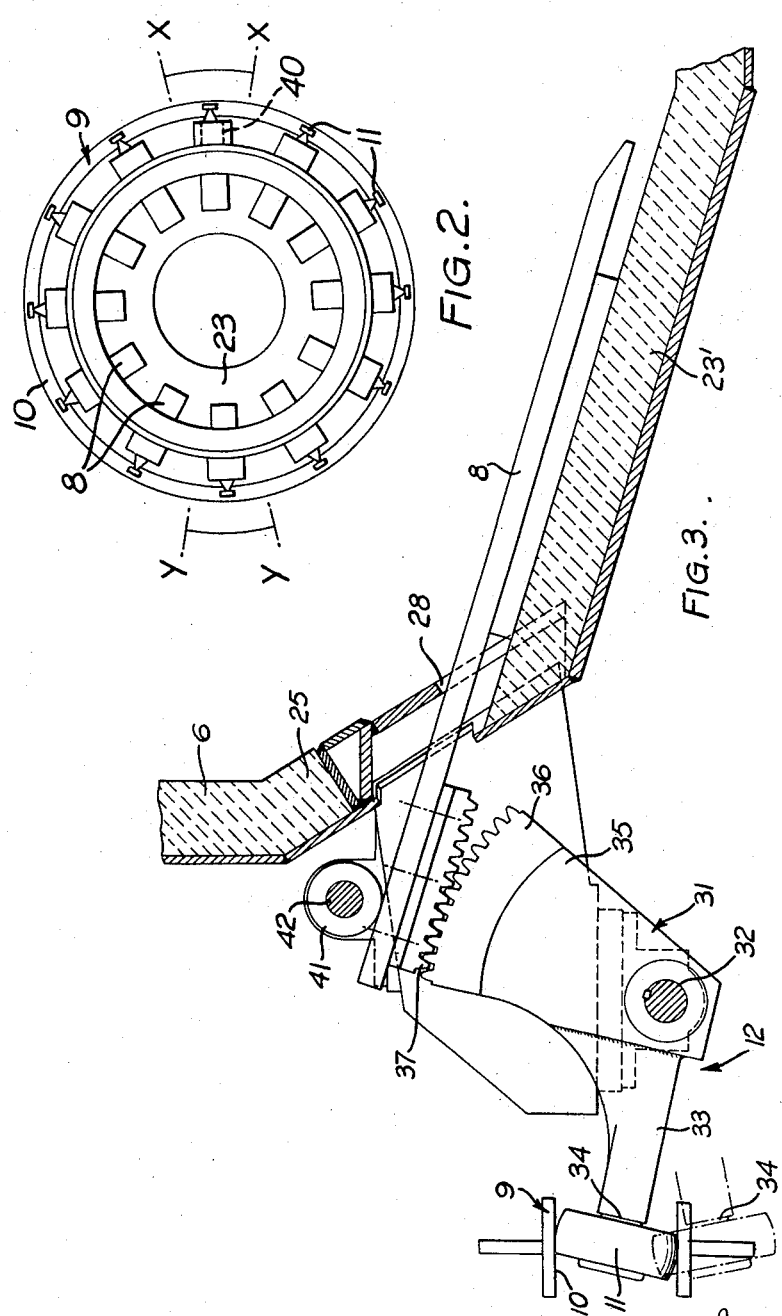

---

2,863,654

MANUFACTURE OF PORTLAND CEMENT, LIME AND THE LIKE

Reginald Vernon Beal, Strood, and Lewis Henry Bishop, Shoreham-by-Sea, England, assignors to The Associated Portland Cement Manufacturers Limited, London, England, a British company Application June 18, 1956, Serial No. 592,145

Claims priority, application Great Britain August 29, 1955

8 Claims. (Cl. 263—32)

This invention relates to the manufacture of Portland cement clinker, lime and the like and to the treatment of ores and minerals in which the materials are subjected to heat in a kiln.

More particularly the invention is concerned with the manufacture of Portland cement clinker in a rotary kiln and with reference to which it is hereinafter described in detail.

In the manufacture of Portland cement the raw materials, calcareous and argillaceous minerals, are finely ground, proportioned and blended, after which they are heated to the point of incipient fusion, a temperature in the region of 1450° C., when chemical reaction occurs with the formation of new clinker minerals which form the basis of the cement.

Two methods are in normal use for the preparation of the raw materials. The "dry process," in which they are first dried, then ground and blended in the dry state to form what is termed a dry raw meal, and the "wet process," in which the grinding takes place in the presence of water to form a slurry or suspension commonly containing about 40% of water. The subsequent heating and clinkering of the raw material can be along either the same or different lines for the wet and dry methods. The processes known and operated at present can be summarised as follows:

(a) The employing of a long slightly inclined rotary kiln, into which either the dry raw meal or wet slurry is fed at the upper end while heat is applied to the lower end. As the material flows through the kiln under the combined effects of the rotation of the kiln and the force of gravity it is first dried in the case of slurry and then heated, calcined and finally clinkered.

(b) Alternatively, the dry raw meal may be formed into nodules by a known process with the addition of about 12 to 14% of water, following which it may either be fed to a rotary kiln as in (a) above or it may be fed on to a continuous travelling grate forming an extension of a short rotary kiln, and on which it may be dried, heated and partly calcined prior to being passed into the rotary kiln for completion of the calcining process and for the clinkering process. Alternatively again the whole of the calcining and clinkering operation may take place on the moving grate, fuel being introduced and burned so as to generate the necessary heat according to a known process.

(c) In the case of dry materials treated as in (b) above, they may be placed direct into a fixed shaft or vertical kiln, the feed being at the upper end and the clinkered material being removed from the lower end. Fuel may be mixed with the feed of raw nodules or introduced at a lower level.

(d) In the case of the wet slurry there may be a dewatering process, such as thickening by sedimentation, by centrifuging, or by filtration, before it is fed into a rotary kiln, onto a drying and calcining grate prior to a rotary kiln or into a vertical shaft kiln. It will be realised that the suitability of various raw materials for treatment as described above will vary with their physical condition and chemical composition. We have found that the wet process has very considerable advantages for the preparation, grinding and blending of the materials, particularly the soft materials such as chalks, marls, clays and the like.

The high water content of the resultant slurry, about 40% water, is however a disadvantage since almost as much fuel is required for drying the slurry as for burning it. Moreover, when treated in an ordinary rotary kiln a substantial amount of the raw materials is entrained as dust in the hot gases and carried out of the kiln, thus necessitating in most cases the use of external dust arrestment equipment.

The main object of the present invention is to provide an improved form of heat exchange plant which makes use of heat in the hot gases from the kiln to reduce by evaporation the water content of the raw material and to heat it, thus effecting a saving in the cost of firing the kiln.

Another object of the invention is to provide a heat exchange unit which will effectively function as a dust separator by extracting the dust particles from the hot gases and avoid the necessity of fitting separate equipment for this purpose.

The present invention is concerned with the treatment of raw material in discrete nodular form preparatory to feeding such material into the kiln and, in the case of Portland cement manufacture, the nodular material will be formed from the dry raw meal as mentioned under (b) above or the dewatered slurry referred to under (d).

According to the present invention a heat exchange apparatus for use in combination with a kiln in the manufacture of Portland cement clinker, lime and the like or in which ores and minerals are subjected to heat treatment comprises a heat exchange chamber mounted to revolve about a vertical axis and having a central inlet for the hot gases from the kiln in its base so as to provide an annular shelf or bed, on to which the raw material is fed in such a manner as to build up into an annular mass supported between the outer wall of the chamber and a central portion so that the gases are caused to pass upwardly through a mass of material to an outlet at the top, means being provided to control the rate of discharge from the bed and thus the input to the kiln.

In the carrying out of the invention the heat exchange chamber is preferably constructed in two parts including a lower and revolving portion mounted to rotate on support rollers and an upper and stationary portion or hood terminating in a duct which connects with a stack pipe or chimney.

The stationary portion or hood may be of conical section and has at one side an inlet opening for the feed of raw materials, which takes place by gravity, the inlet opening being positioned at one side and above the annular space between the centre and the outer wall of the lower revolving portion of the heat exchange chamber, the opening being so arranged that when the chamber is in operation, the material will fall on to the top of the annular bed of material contained in the chamber, the material continuously piling itself up on the shelf as the chamber revolves.

The said lower portion of the chamber may be partly conical and at its junction with the upper portion the two portions are interconnected by an air tight seal. It should be understood that the dome plate combines with the conical part of the outer wall of the lower portion of the chamber to provide an annular throat in which the material builds up above the shelf or bed on the base of the chamber.

The invention is illustrated in the accompanying drawings in which:

Figures 1a and 1b together constitute a diagrammatic elevation, showing a slightly inclined kiln for the production of Portland cement clinker operating in conjunction with a heat exchange chamber in accordance with the invention.

Figure 2 is a sectional plan view of the line II—II of Figure 1a and showing the actuating mechanism for the pusher plates or rams.

Figure 3 is a detail transverse sectional view on an enlarged scale showing part of the wall and hearth of the heat exchange chamber and one of the pusher plates or rams together with the actuating mechanism drive.

Figure 1:
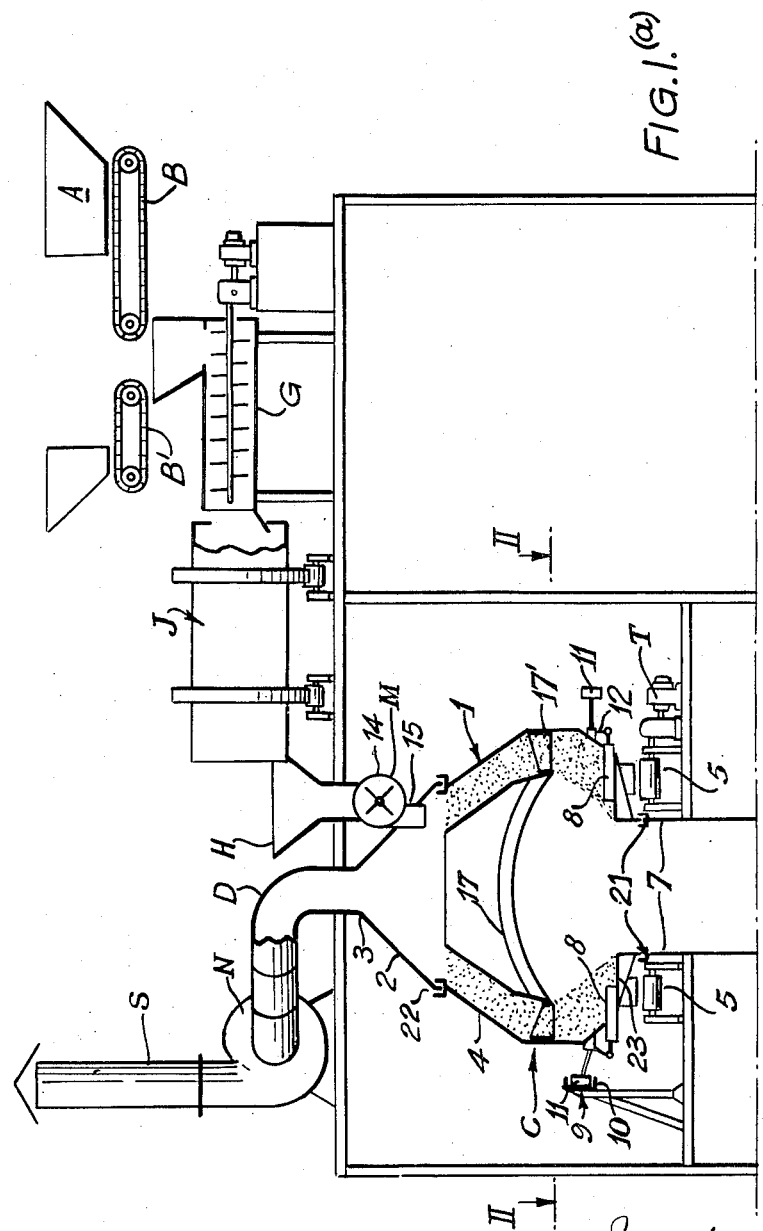

In the drawings, Figure 1b, K indicates generally a slightly inclined kiln having tyres R, by which it is mounted to rotate about an axis at an incline to the horizontal, being supported on rollers P.

The hot gases from the kiln K on passing from the inlet end thereof are led by a vertical flue F to a heat exchange apparatus indicated generally at C, into which the raw materials are fed from a hopper or chute H as will hereinafter be explained. The gases from the heat exchange apparatus C escape to atmosphere through a duct D which leads into a stack pipe S and if necessary may be drawn out by a fan N in the duct D.

The raw material in the form of filter cake from a conventional filter press is fed at the required rate from a chute A delivering onto an endless conveyor B, which conveyor discharges into a cutter and mixer G where the cake is cut into small pieces and mixed if necessary, with dry powder fed from a second feed conveyor B'. The material then passes into a rotating forming drum J where it is rolled into discrete more or less spherical nodules which pass into the hopper H and are then discharged through a rotary airlock M into the upper portion of the heat exchanger C.

The heat exchanger of this invention essentially comprises a revolving chamber and for convenience it is formed in two portions, a lower portion 1 which is mounted to revolve, being supported on rollers 5, and an upper portion 2 which is stationary and in the form of a truncated cone, its upper end 3 being connected to the outlet duct D. The lower and rotating portion 1 of the heating chamber is of generally annular construction but has a conical upper portion 4 which is joined by a sand or other substantially gas-tight seal 22 to the upper portion 2.

It will be seen that the base of the chamber 1 is in the form of an annulus 23 so as to provide a central opening 7, through which the raw material after being dried by extraction of heat from the ascending hot gas stream from the kiln passes into the vertical flue F. Supported centrally within the upper conical portion 4 of the chamber 1 is a refractory dome portion 17.

The central dome section 17 may be constructed from refractory material in either monolithic or built up form or may be of mild steel plate, lined with refractory material, or of heat resisting or stainless steel either with or without a refractory or insulating layer.

The central section 17 may be attached to the conical body part 4 of the heat exchange chamber by brackets 17', these brackets being arranged to cause the minimum obstruction to the raw material, which in the form of nodules is continuously fed into the chamber through an inlet pipe 15 from a valve 14. It will be understood that the central dome 17 combines with the conical part 4 to provide an annular throat within which the material builds up above the shelf or bed provided by the base plate 23.

In order to secure optimum results when operating the heat exchange unit C of this invention it is desirable for the raw material to be fed as nodules so as to provide paths for the gas through the annular mass supported on the bed of the chamber at any one moment. When the starting material consists of a slurry its water content is first reduced by filtration in known manner to below 20% of water. The resultant filter cake can then as already described be conveniently formed into more or less spherical nodules using the apparatus including the cutter and mixer G and revolving drum J.

Alternatively the nodules may be formed from dry powdered raw meal with the addition of 12 to 14% of water in a dish or drum type of granulator according to known methods.

When applied to the manufacture of cement clinker it is essential to the efficient operation of the cement kiln to provide means for controlling the rate of discharge of raw material from the annular hearth 23 of the heat exchanger 1 and conveniently such means consists of a series of pusher plates or rams 8, these rams being caused to reciprocate radially (see Figure 2) in the base of the chamber by means of a cam mechanism indicated generally at 9, which operates externally to the chamber.

The cam actuating gear in the embodiment illustrated consists of a fixed cam track in the form of a channel surrounding the heat exchanger, in which run rollers 11 coupled through linkages, indicated at 12 in Figs. 1a and 3, to their associated pusher plates or rams. The shape of the cam track is such that at selected points in its circumference each roller in turn is lifted above its normal position and thereafter returned to it, thus moving forward its associated pusher plate or ram and thereby pushing or ejecting a portion of the material being treated so that it falls over the edge of the annulus 23 into the flue 7. The detailed operation of the linkage 12 and the means of actuating the rams 8 will hereinafter be described with reference to Fig. 3.

In order to vary the throw of the rams, provision is made for adjusting the position of the cam ring 9 so that its vertical height above the normal or ram withdrawn position may be varied to control the amount of material discharged.

It follows therefore that as chamber 1 rotates, which rotational movement is obtained by a motor drive T directly geared to the rollers 5, the rams 8 will receive a to and fro motion in a direction which is radial to the annular hearth 23 with the result that the raw material will be pushed on the forward stroke of the rams over the edge of the hearth 23 and into the vertical flue shaft F.

The material then passes into the kiln K via the flue F and a chute F' provided for this purpose. Its passage through the kiln K and its subsequent treatment follows common practice. 16 indicates a fuel burner by which the necessary fuel is introduced.

Referring now to Figure 3 there is shown so much of the heat exchange chamber as is sufficient to illustrate operation of the pusher plates.

In the arrangement shown in Figure 3 the base includes an inclined section 23' connected by a ported section 25 to the vertical side wall 6 of the heat exchange chamber 1. In the part 25 are a series of circumferentially spaced openings 28 and slidable within each opening and extending over the part 23' of the hearth is a pusher plate 8. These pusher plates 8 as shown in the plan view of Figure 3 are spaced apart at equal distances over the circumference and, as already explained, are successively displaced as the chamber revolves in order to bring about a continuous discharge of the nodules of material undergoing drying by reason of the upward passage of the kiln gases through the chamber.

In this construction the cam track 10 is vertically contoured to produce an upwards and downwards displacement of the cam rollers 11.

Each actuating linkage 12 consists of a bell crank lever indicated generally at 31 mounted to rock about a hinge pin 32.

One arm 33 of the bell crank lever which is arranged radially with respect to the central axis of the drying chamber has a stub axle 34 on which is journalled the roller 11. The rollers 11 bear against the underside of the cam track 10 and as indicated by the dot and dash lines the track has in one portion of its periphery a sector at a different elevation in order to cause displacement of the roller and thus an angular movement of the bell crank 31. The other arm 35 of the bell crank lever which in practice is preferably bifurcated, so as to provide a double arm has adjustably bolted to each arm a toothed sector plate, indicated at 36, the teeth thereon meshing with racks 37 of which there are two spaced to correspond and secured to the underside of the pusher plates 8 as diagrammatically indicated by the dotted lines 40 in Figure 2.

The upper side of the pusher plate 8 rides beneath rollers 41 mounted on spindles 42 and thus maintain the racks 37 in driving engagement with their sectors 36.

It follows therefore, that as the chamber 1 revolves the individual bell cranks 31 together with their driving rollers 11 move with it and so long as the rollers are driving in engagement with that section of the cam track 9 in the neighbourhood of the lines X—X no further advancement of the pusher plates will take place.

On leaving this sector the rollers 11 will be gradually forced downwardly and at the same time bring about a rocking movement of the bell cranks about their hinge pins 32 with the result that the pusher plates will be drawn outwardly and away from the edge of the discharge aperture. This movement continues until the maximum position of withdrawal is arrived at in passing through the sector Y—Y. On the reverse or return stroke the pusher plates 8 will be advanced inwardly to bring about gradual discharge of the contents of the drying chamber in that area.

In an alternative embodiment the cam track takes the form of a ring which may be located eccentrically with the body of the heat exchanger and in which run on vertical axles rollers which are directly connected to the pusher plates or extensions thereof, so that as the heat exchanger rotates the rollers and thereby the pusher plates are moved in a radial fashion thus discharging the material as before. The cam ring in this embodiment may be either circular or of other configuration suitable for the purpose.

From the foregoing it will be clear that the nodules are discharged by the rams or other means which are operated positively to extract them at a regular and controllable rate as required by the operation of the rotary kiln. In practice therefore, each pusher is constrained by the cam gear to reciprocate one or more times per revolution of the heat exchanger and operates to push forward and discharge through the central discharge orifice a substantially constant quantity of material at each reciprocation.

In order to avoid excessive dust entrainment of the material in the gas stream, the cam ring controlling the movement of the pushers may be so located that the material is discharged around only that part of the perimeter of the central discharge opening which is opposite to the position of the kiln opening, the object being to ensure that no material passes through the main part of the ascending gas stream.

It will be seen that hot gases from the rotary kiln K, which is fired at the lower end by the fuel burner 16, pass up the flue F and being prevented from passing through the centre of the rotating lower zone 4 of the heat exchanger by the refractory dome portion 17 pass through the bed of raw material nodules supported in the annular space 6 by the annular base plate 23. The gases are drawn out through the duct D by the fan N whence they pass to atmosphere via the stack pipe S.

At the junction between the rotating heat exchanger 4 and the flue F is a sand or other substantially gas tight seal 21 and again between the heat exchanger 4 and the duct D is a similar seal 22 which prevents the induction of atmospheric air which would dilute the hot kiln gas and reduce the efficiency of the system.

We have found that from the use of the heat exchange chamber of this invention and that by operating the kiln with this process the following objects are attained:

(1) The reduced water content in the raw material, together with the heat exchange characteristics of the gas permeable bed of nodules in the heat exchanger, enables a lowering of the fuel consumption for the drying, calcining and clinkering process by as much as 30% of the fuel normally required in the wet process.

(2) The formation of a bed of nodules, in which the upper layer is moist and initially cold and through which the dust laden gases from the kiln pass via the tortuous passages between the nodules, is a very effective means of arresting the dust from the rotary kiln which is entrained by the gases. Such dust adheres to the surface of the nodules, particularly to the upper layer on which, in the early stages of heating, there is condensed a film of moisture from out of the hot moist gas.

(3) The rotation of the heat exchanger enables a regular feed of nodules to be made around the annulus, thus building a bed of substantially constant characteristics around the annulus and resulting in even gas distribution and most efficient heat exchange.

(4) The regular operation of the extractor mechanism as the heat exchanger rotates effects a regular and even discharge. The rate of throughput of raw material may be regulated either by the speed of rotation of the heat exchanger and consequently the frequency at which the discharge pushers operate, or alternatively or additionally by varying the stroke or capacity of the pushers.

(5) The shaping of the heat exchanger as a shallow annulus gives the possibility of having the required large cross-sectional area at shallow bed depth and still obtaining an even and regular movement downwards of the material. If a cylindrical vessel of equivalent area and depth were used it would be difficult if not impossible to maintain even movement and equal feed and discharge, and consequently even gas flow over the whole area. The annular shape described gives the possibility of substantially even movement of material and gas and consequently results in the most effective heat transfer and in a product of equal and consistent quality.

While the invention has been described and illustrated with reference to the manufacture of cement clinker it should be understood that the heat exchange unit has other uses and may be used in the treatment of ores.

What is claimed is:

1. Heat treatment apparatus comprising an annular heat treatment chamber having openings at the top and bottom thereof respectively to permit through-flow of hot gases; means mounting said chamber to revolve bodily about a vertical axis; an annular shelf located in the base portion of said chamber and upon which material to be heat treated may build up into an annular bed extending up through said chamber; stationary feed means located above said chamber for charging discrete modular material into the top of said chamber to deposit said material uniformly on the top of said annular bed during bodily rotation of said chamber; an inlet for hot gas communicating with said opening in the bottom of the chamber; an exhaust hood connected to said opening in the top of the chamber for removal of exhaust gases therefrom; a discharge outlet for treated material in the base of said chamber; and discharge means for positively discharging treated material through said discharge outlet, said discharge means comprising a plurality of discharge members mounted at the bottom of said chamber to revolve with said chamber and to move relatively to said chamber, and means automatically operable upon revolution of said chamber to actuate said discharge members in succession so as to effect continuous discharge of treated material through said discharge outlet.

2. Heat treatment apparatus according to claim 1 wherein said inlet for hot gas also constitutes the discharge outlet for treated material.

3. Heat treatment apparatus according to claim 2 wherein said discharge outlet is located centrally with respect to said chamber and each discharge member is mounted for movement radially inwardly relatively to said chamber for exerting a pushing action on the treated material to direct said material into the discharge outlet, the means which actuate said discharge members imparting a reciprocatory motion thereto.

4. Heat treatment apparatus according to claim 3 comprising support rollers upon which said chamber is mounted for bodily rotation; a stationary cam track; and a plurality of rocker arms operable by said cam track and being connected respectively to said discharge members for actuating said discharge members as the rocker arms are operated by said cam track.

5. Heat treatment apparatus according to claim 4 comprising means for adjusting the position of the cam track whereby the throw of the discharge members may be varied.

6. Heat treatment apparatus according to claim 4 including openings in the outer wall of said chamber through which said discharge members respectively extend; racks connected to said discharge members respectively outside said chamber; and gear sectors on said rocker arms respectively and meshing with the racks connected to the respectively associated discharge members.

7. In combination, an annular heat treatment chamber having openings at the top and bottom thereof respectively to permit through-flow of hot gases; means mounting said chamber to revolve bodily about a vertical axis; an annular shelf located in the base portion of said chamber and upon which material to be heat treated may build up into an annular bed extending up through said chamber; stationary feed means located above said chamber for charging discrete nodular material into the top of said chamber to deposit said material uniformly on the top of said annular bed during bodily rotation of said chamber; an inlet for hot gas communicating with said opening in the bottom of the chamber; an exhaust hood connected to said opening in the top of the chamber for removal of exhaust gases therefrom; a discharge outlet for treated material in the base of said chamber; discharge means for positively discharging treated material through said discharge outlet, said discharge means comprising a plurality of discharge members mounted at the bottom of said chamber to revolve with said chamber and to move relatively to said chamber, and means automatically operable upon revolution of said chamber to actuate said discharge members in succession so as to effect continuous discharge of treated material through said discharge outlet; a kiln; and a flue communicating at one of its ends with said kiln and communicating at the other of its ends with said chamber inlet for hot gases and said discharge outlet for treated material whereby material which has been heat treated in said chamber is transferred into said kiln.

8. Heat treatment apparatus comprising a chamber section having therein a central dome section providing conjointly with said chamber section an annular heat treatment chamber having openings at the top and bottom thereof respectively to permit through-flow of hot gases; means mounting said chamber to revolve bodily about a vertical axis; an annular shelf located in the base portion of said chamber and upon which material to be heat treated may build up into an annular bed extending up through said chamber; stationary feed means located above said chamber for charging discrete nodular material into the top of said chamber to deposit said material uniformly on the top of said annular bed during bodily rotation of said chamber; an inlet for hot gas communicating with said opening in the bottom of the chamber; an exhaust hood connected to said opening in the top of the chamber for removal of exhaust gases therefrom; a discharge outlet for treated material in the base of said chamber; and discharge means for positively discharging treated material through said discharge outlet, said discharge means comprising a plurality of discharge members mounted at the bottom of said chamber to revolve with said chamber and to move relatively to said chamber, and means automatically operable upon revolution of said chamber to actuate said discharge members in succession so as to effect continuous discharge of treated material through said discharge outlet.

References Cited in the file of this patent

UNITED STATES PATENTS

| | | |
|---|---|---|
| 1,558,119 | Sherban | Oct. 20, 1925 |
| 1,955,277 | Fasting | Apr. 17, 1934 |
| 1,999,761 | Howard | Apr. 30, 1935 |